Oct. 12, 1943.     R. M. WALKER ET AL     2,331,525
AUTOMATIC OUTLET BOX MAKING MACHINE
Filed Nov. 6, 1941     12 Sheets-Sheet 1
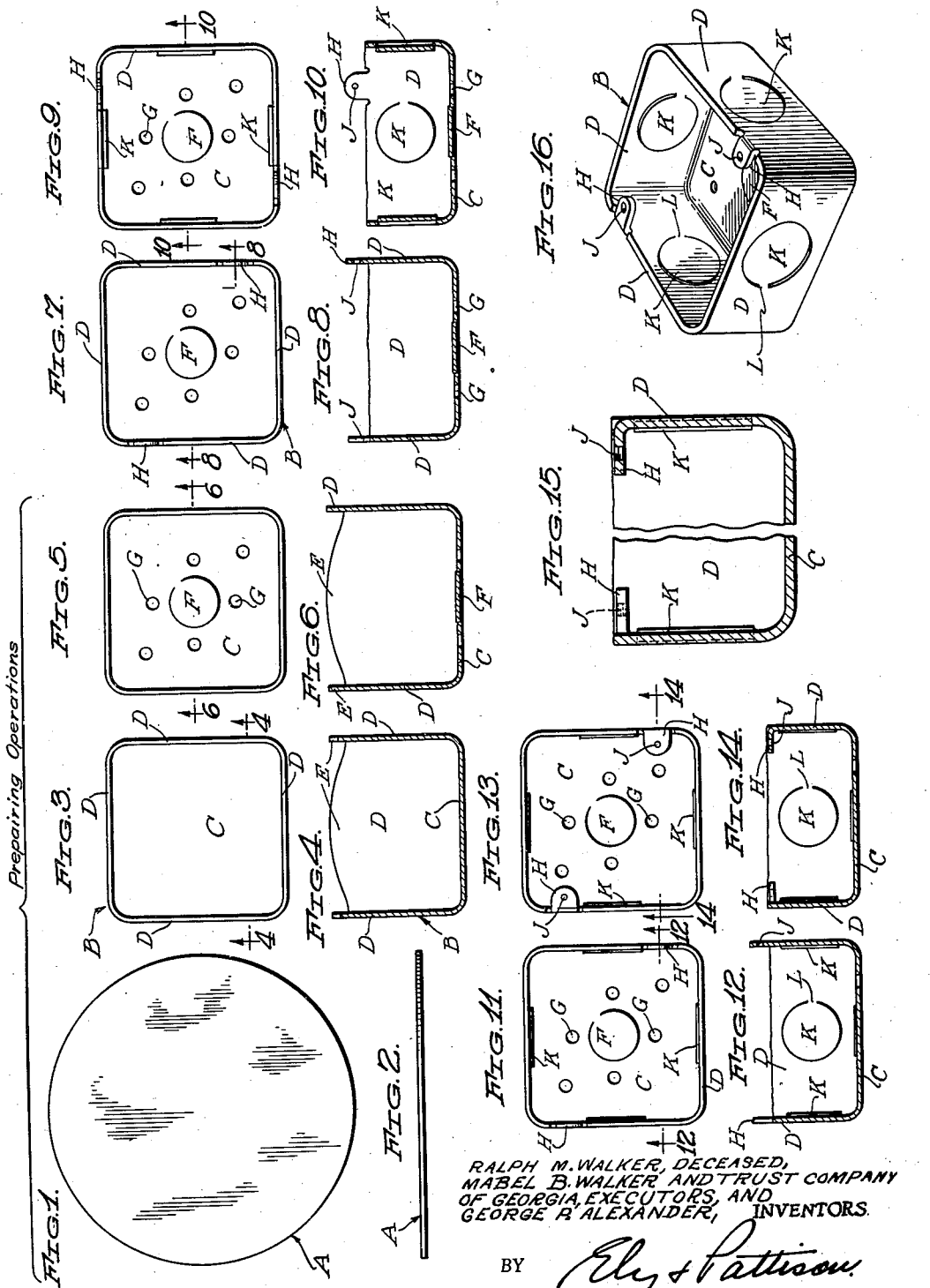
RALPH M. WALKER, DECEASED,
MABEL B. WALKER AND TRUST COMPANY
OF GEORGIA, EXECUTORS, AND
GEORGE R. ALEXANDER, INVENTORS.
BY Ely & Pattison
ATTORNEYS.

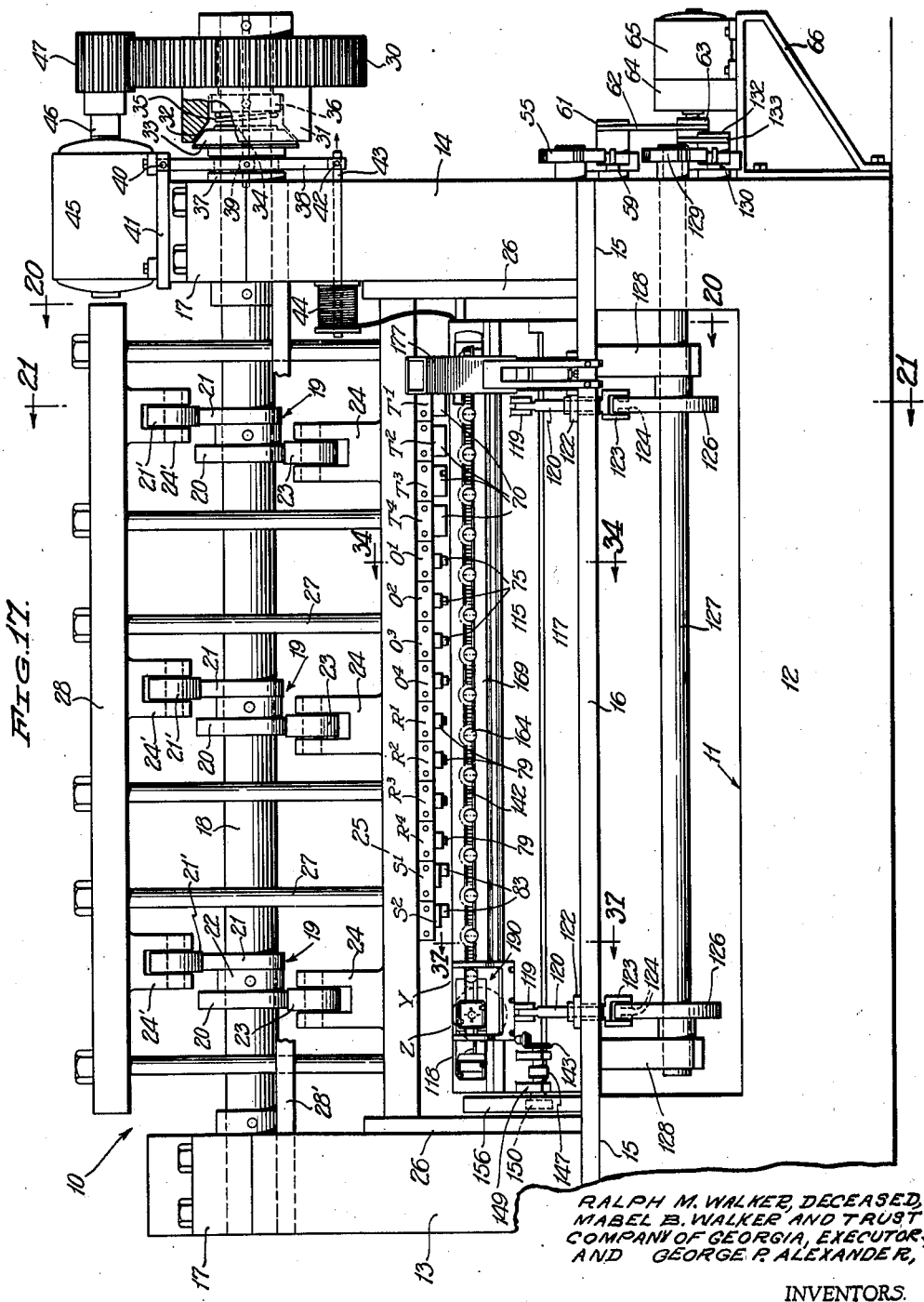

Oct. 12, 1943.   R. M. WALKER ET AL   2,331,525
AUTOMATIC OUTLET BOX MAKING MACHINE
Filed Nov. 6, 1941   12 Sheets-Sheet 3
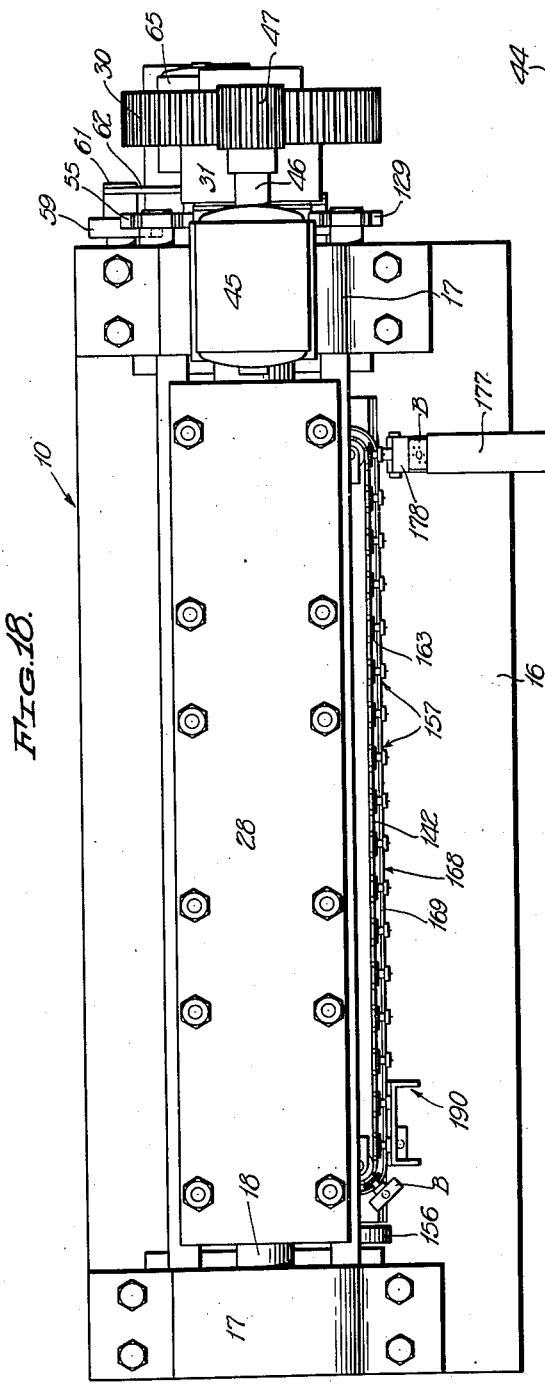
RALPH M. WALKER, DECEASED,
MABEL B. WALKER AND TRUST
COMPANY OF GEORGIA, EXECUTORS,
AND RALPH P. ALEXANDER,
INVENTORS.
BY *Ely & Pattison*
ATTORNEYS.

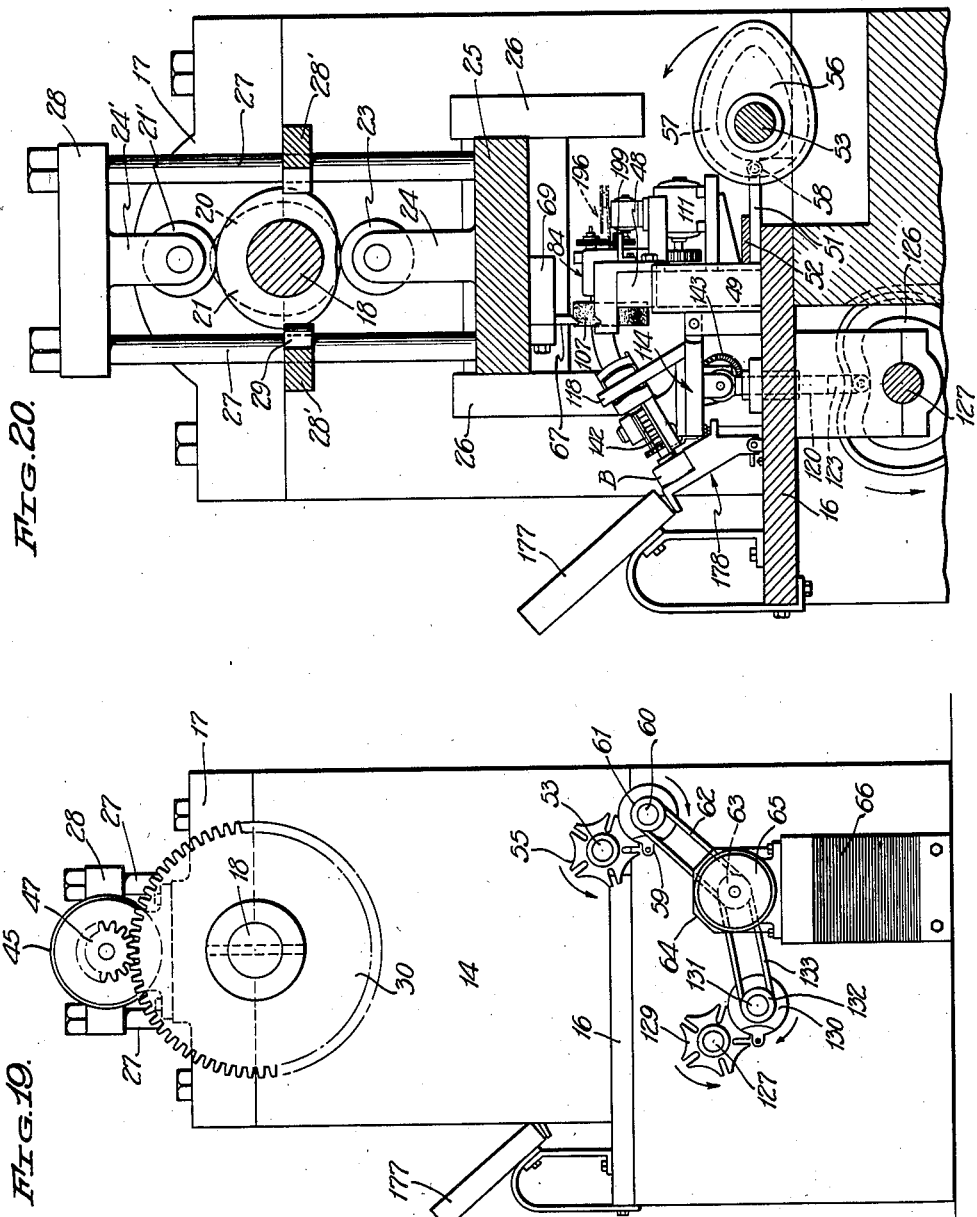

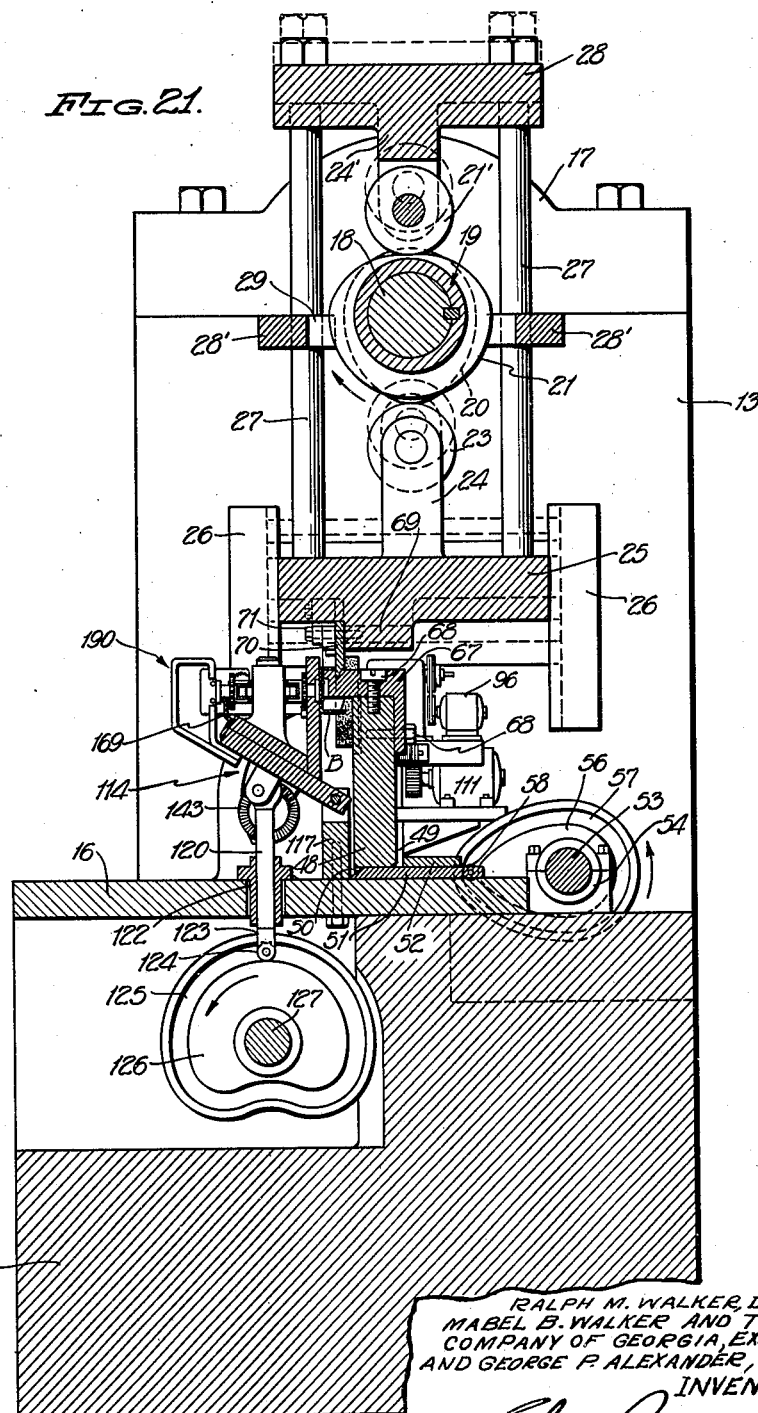

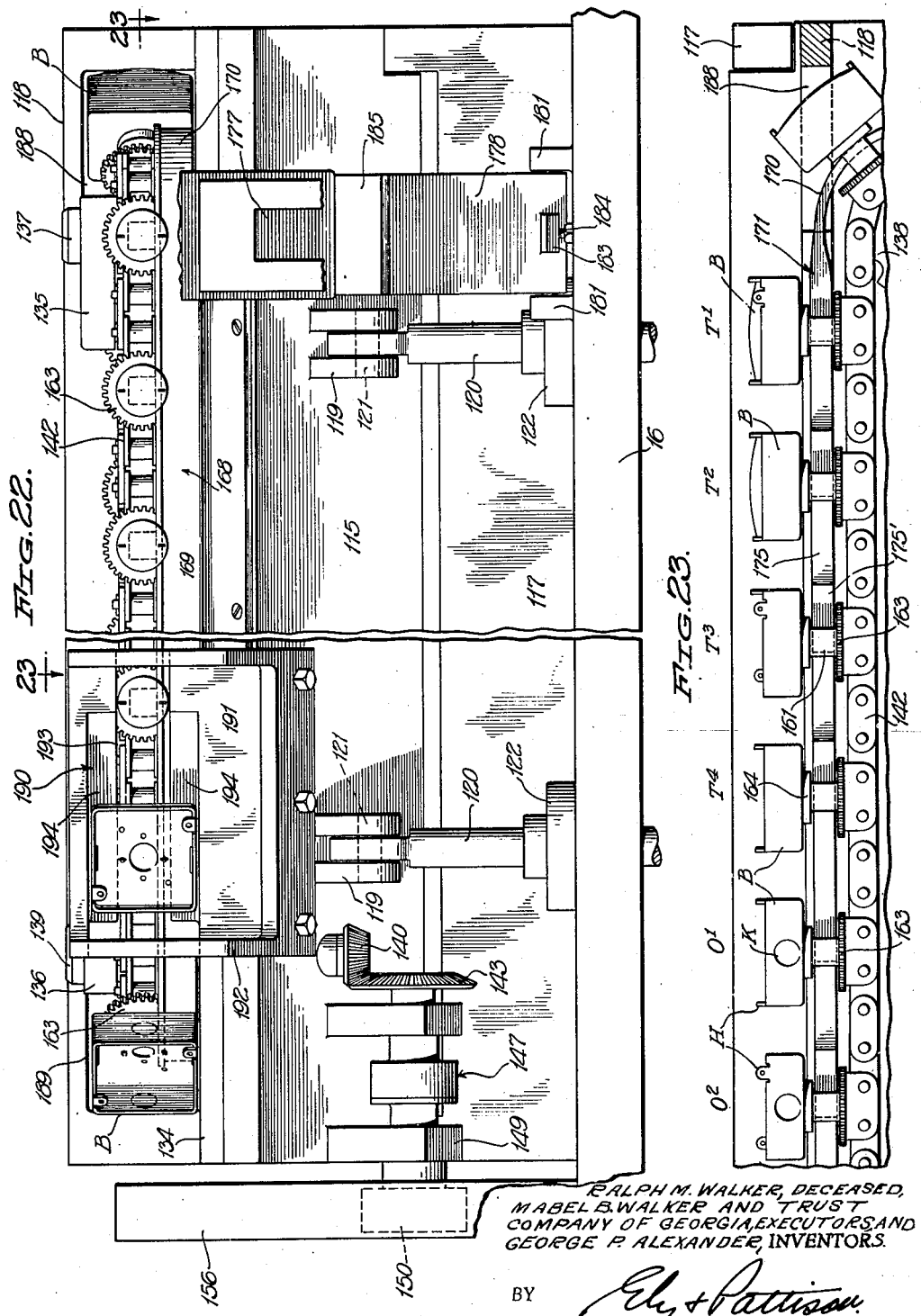

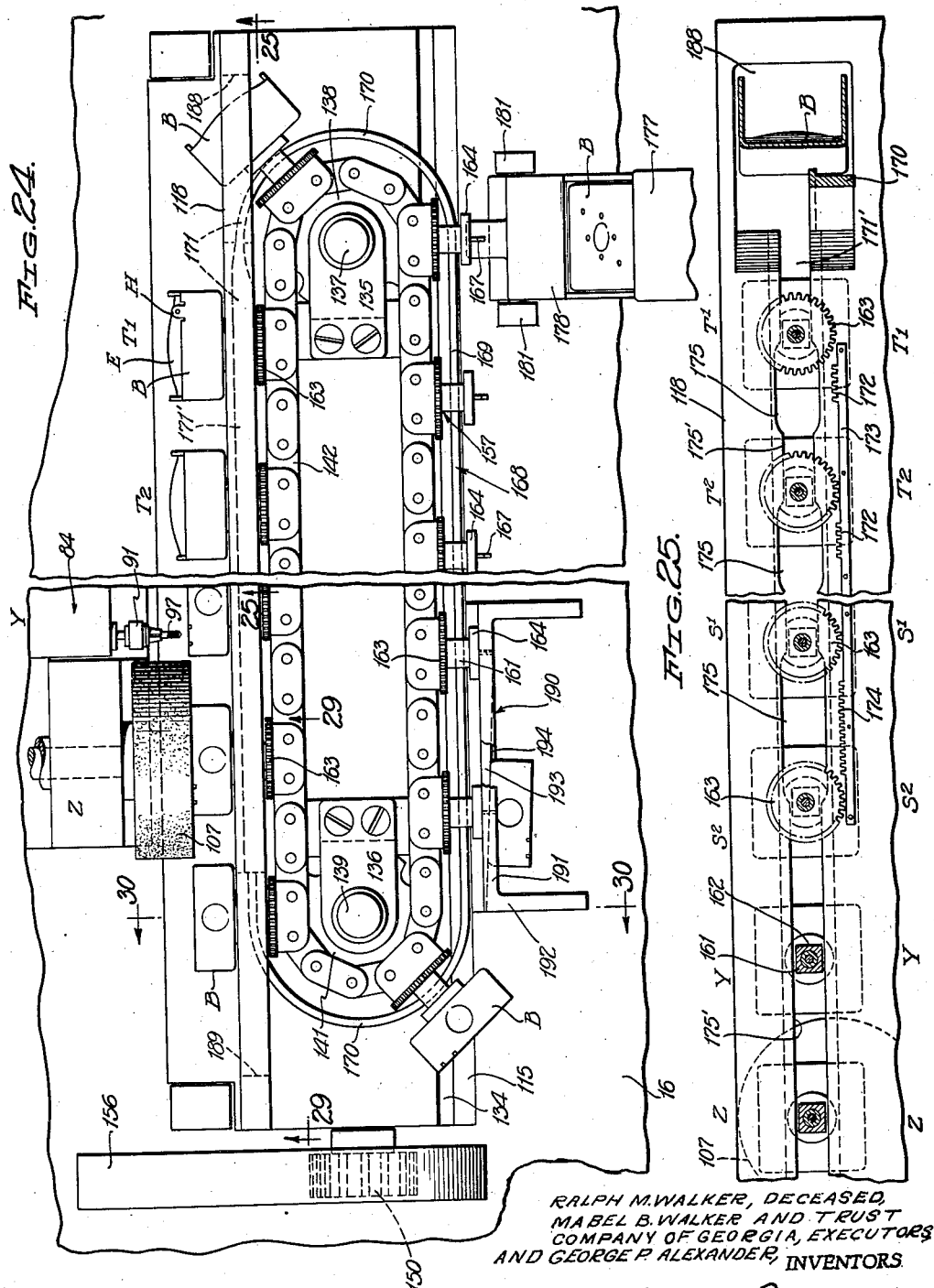

Oct. 12, 1943.  R. M. WALKER ET AL  2,331,525
AUTOMATIC OUTLET BOX MAKING MACHINE
Filed Nov. 6, 1941  12 Sheets-Sheet 8
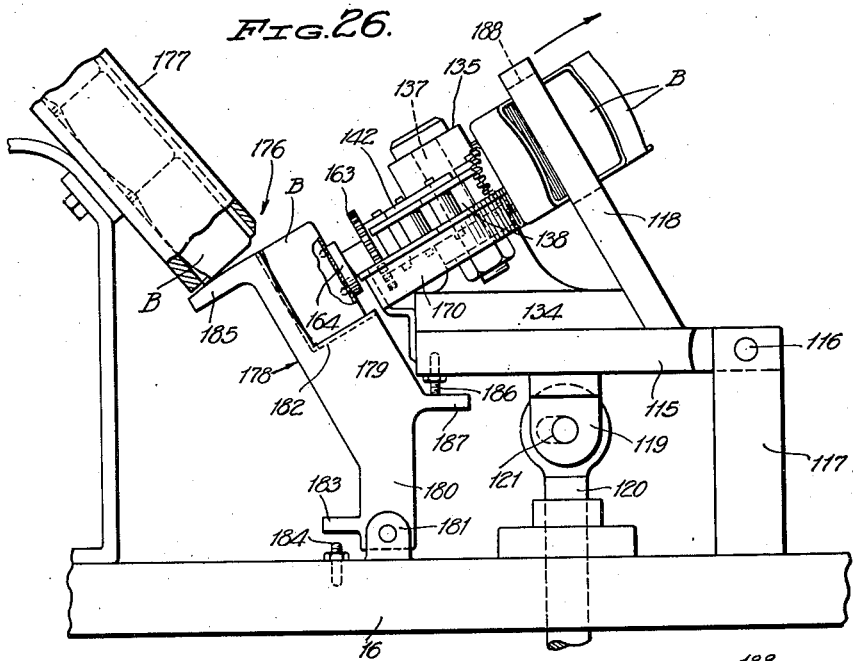

Oct. 12, 1943.   R. M. WALKER ET AL   2,331,525
AUTOMATIC OUTLET BOX MAKING MACHINE
Filed Nov. 6, 1941   12 Sheets-Sheet 9

RALPH M. WALKER, DECEASED,
MABEL B. WALKER AND TRUST COMPANY
OF GEORGIA, EXECUTORS, AND
GEORGE P. ALEXANDER, INVENTORS.

BY *Ely & Pattison*
ATTORNEYS.

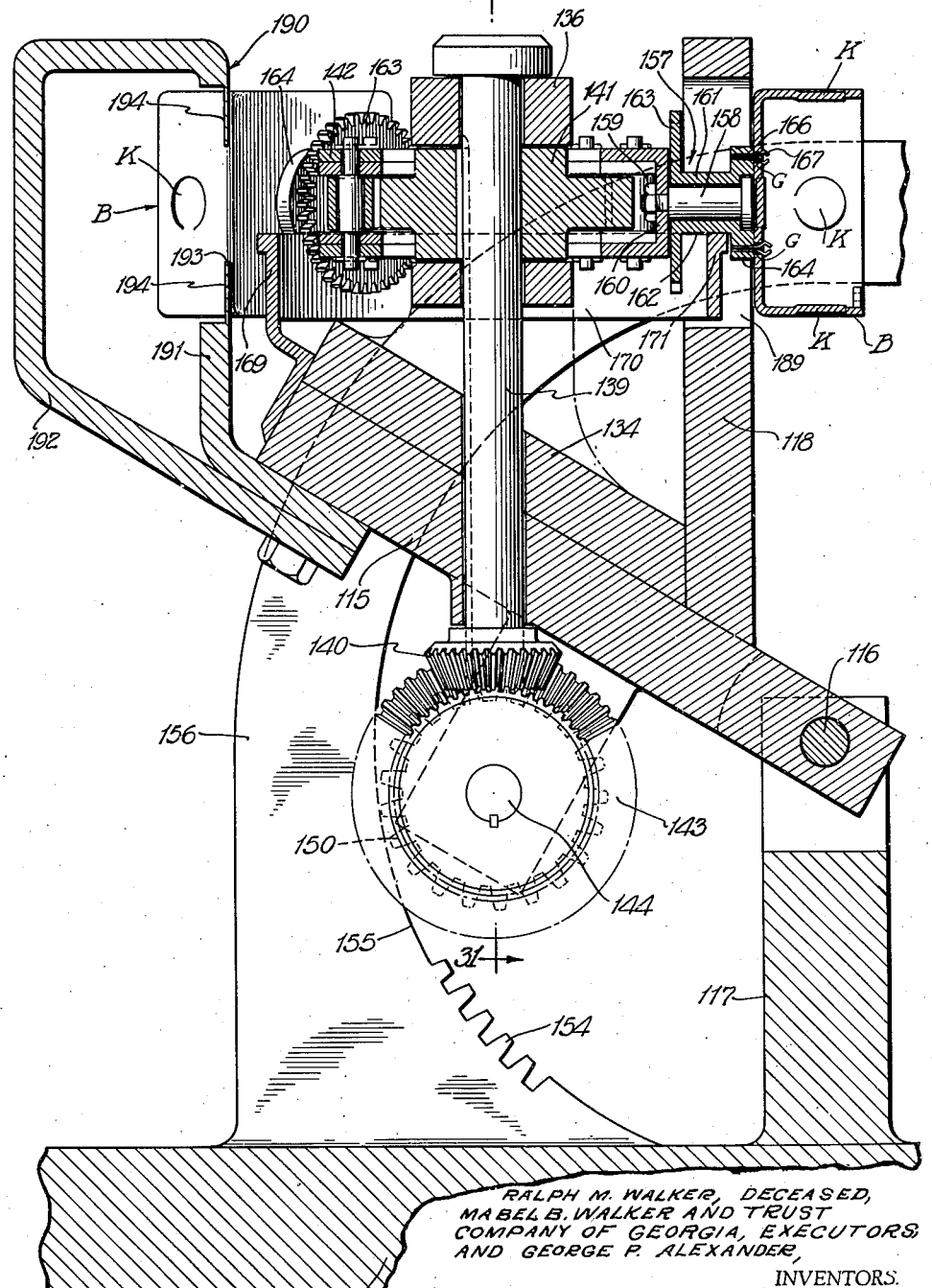

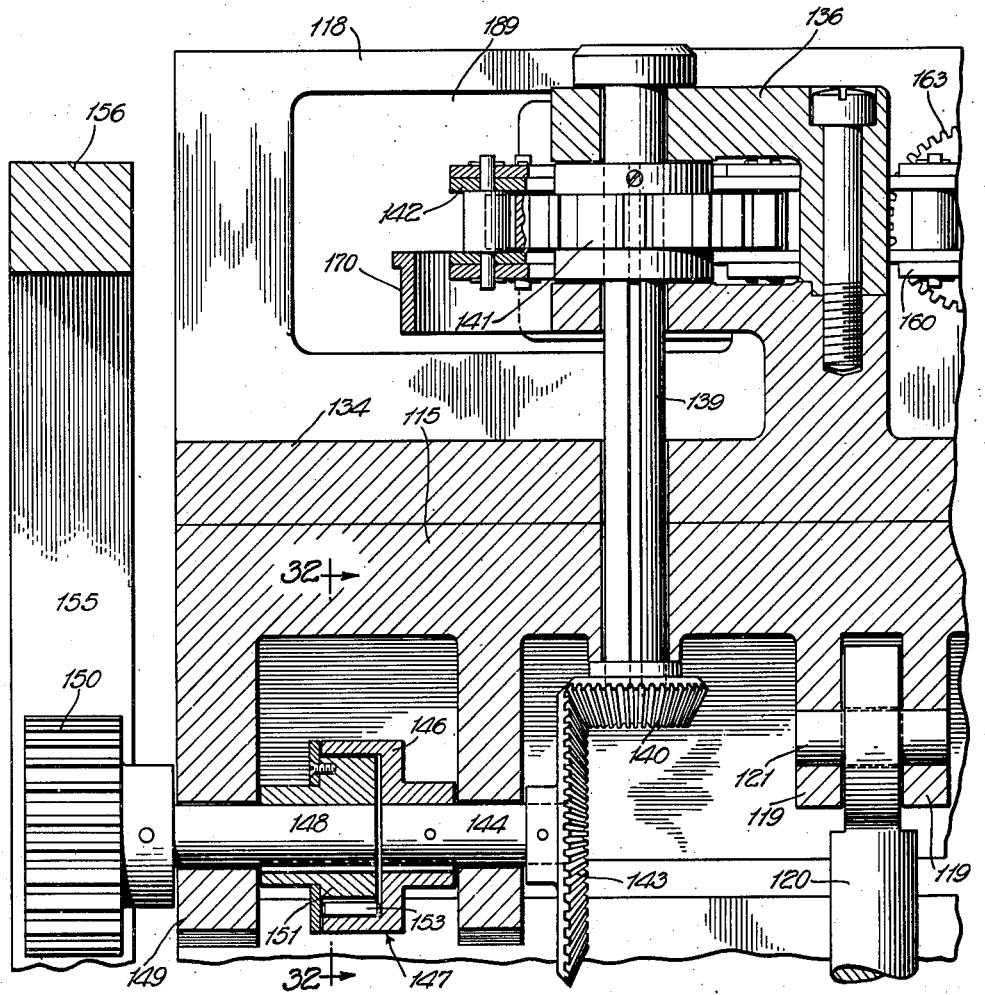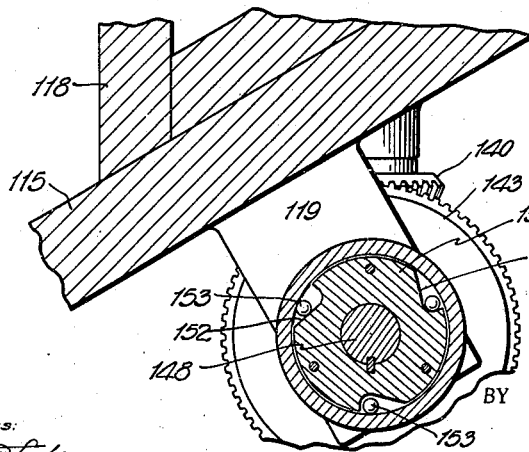

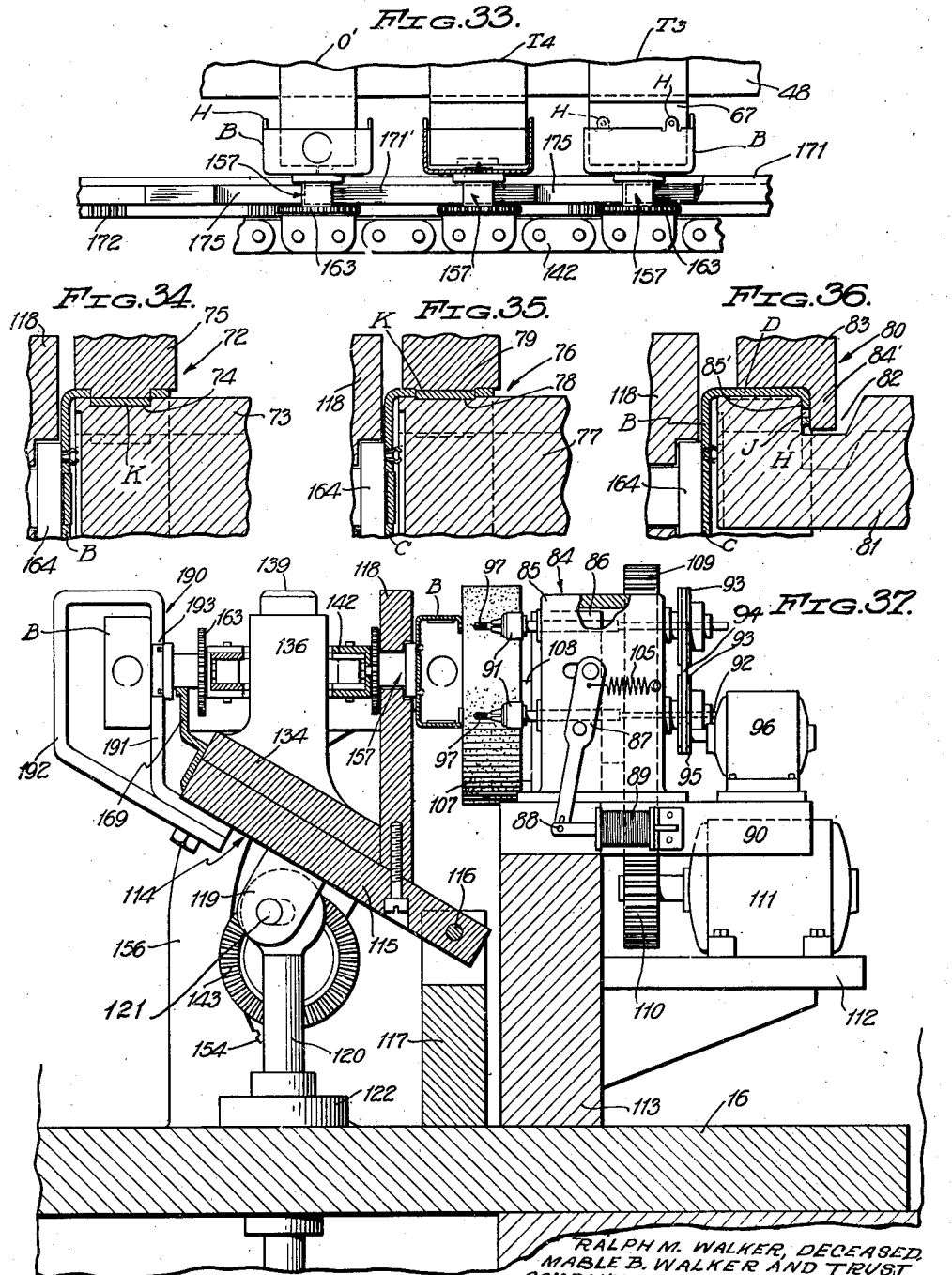

Patented Oct. 12, 1943

2,331,525

UNITED STATES PATENT OFFICE 2,331,525

AUTOMATIC OUTLET BOX MAKING MACHINE

Ralph M. Walker, deceased, late of Atlanta, Ga., by Mabel B. Walker and Trust Company of Georgia, executors, Atlanta, Ga., and George P. Alexander, Miami, Fla., assignors to Walker Electrical Company, Atlanta, Ga., a corporation of Georgia Application November 6, 1941, Serial No. 418,026

9 Claims. (Cl. 29—33)

This invention relates to improvements in automatic machines for successively performing operations upon pieces of work, and more specifically the invention relates to an automatic machine for making outlet, junction, and other metal electrical boxes of the type having knockout openings therein and which are used in electrical installations.

The primary object of this invention resides in an automatic machine for the making of outlet boxes which will reduce the cost of labor and expedite the manufacture of outlet boxes in comparison with the conventional methods and apparatus heretofore employed for such purpose.

Another feature of the invention is to provide an automatic combined machine for, first; trimming the edges of a drawn metal outlet box and simultaneously forming the cover attaching ears; second, punching the knockouts in the several side walls thereof, which knockouts are pushed beyond the plane of the side walls; third, replacing the punched knockouts in the several side walls; fourth, bending the opposed cover attaching ears at right angle to the side walls; fifth, tapping the attaching ears; and, sixth, grinding the burrs off the free edges of the side walls and thereby completing the outlet box.

A further feature of the invention is the provision of an automatic machine in which the above mentioned operations are simultaneously performed on a plurality of outlet boxes as they successively pass from one operating work station to another, thus eliminating the individual manual operations and machinery now employed in the manufacture of outlet boxes.

With these and other objects in view, the invention resides in the novel combination and arrangement of mechanisms hereinafter fully described and illustrated in detail in the accompanying drawings, in which, Figure 1 is a plan view of the metal blank disk from which an outlet box is formed.

Figure 2 is an edge elevation thereof.

Figure 3 is a top plan view of a square shape type outlet box after being drawn from the blank.

Figure 4 is a vertical sectional view on the line 4—4 of Figure 3.

Figure 5 is a top plan view of the box after receiving the bottom knockout and nail holes.

Figure 6 is a vertical sectional view on the line 6—6 of Figure 5.

Figure 7 is a top plan view of the box with the edges trimmed to form the cover attaching ears, and openings punched therein.

Figure 8 is a vertical sectional view on the line 8—8 of Figure 7.

Figure 9 is a plan view of the box illustrating the four side wall knockouts punched therein and disposed on a plane inwardly of the side walls.

Figure 10 is a vertical sectional view on the line 10—10 of Figure 9.

Figure 11 is a top plan view illustrating the side wall knockouts replaced.

Figure 12 is a vertical sectional view on the line 12—12 of Figure 11.

Figure 13 is a plan view of the box with the attaching ears bent inwardly at right angle to the side walls.

Figure 14 is a vertical sectional view on the line 14—14 of Figure 13.

Figure 15 is an enlarged vertical fragmentary sectional view illustrating the openings in the attaching ears as having been thread tapped.

Figure 16 is a perspective view of the outlet box with the burred edges ground off and in finished condition for use.

Figure 17 is a front elevational view of the outlet box making machine with the ram in raised position.

Figure 18 is a top plan view of the machine.

Figure 19 is a right end elevational view of the machine.

Figure 20 is a vertical transverse sectional view on the line 20—20 of Figure 17.

Figure 21 is an enlarged vertical transverse sectional view on the line 21—21 of Figure 17 illustrating the position of the parts when the ram is in lowered position in full lines, the ram being shown in raised position in dotted lines.

Figure 22 is an enlarged fragmentary front elevational view.

Figure 23 is a fragmentary horizontal sectional view on the line 23—23 of Figure 22.

Figure 24 is an enlarged fragmentary top plan view of the machine.

Figure 25 is a fragmentary vertical longitudinal sectional view on the line 25—25 of Figure 24.

Figure 26 is an end elevational view of the box carrier mechanism looking at the left end and illustrating the position of the same when picking up a box at the feed chute, certain parts being shown in section.

Figure 27 is a view similar to Figure 26, but showing the box carrier mechanism in position to present the boxes carried thereby to the respective work stations.

Figure 30 is an enlarged vertical transverse sectional view on the line 30—30 of Figure 24.

Figure 31 is a fragmentary vertical sectional view on the line 31—31 of Figure 30.

Figure 32 is a detail vertical sectional view on the line 32—32 of Figure 31.

Figure 33 is a detail top plan view with parts broken away of two adjacent trimming dies of a knockout punch.

Figure 34 is an enlarged detail vertical sectional view through one of the knockout dies.

Figure 35 is an enlarged detail vertical sectional view through one of the return knockout dies.

Figure 36 is an enlarged detail vertical sectional view through one of the ear bending dies.

Figure 37 is an enlarged detail vertical transverse sectional view taken substantially on the line 37—37 of Figure 17, the box carrier being shown in a position presenting a box to the tap mechanism.

Figure 38 is a diagrammatic wiring diagram of the electrical control for actuation of the thread tapping device.

Figure 39 is a diagrammatic wiring diagram of the clutch control means.

Figure 28:
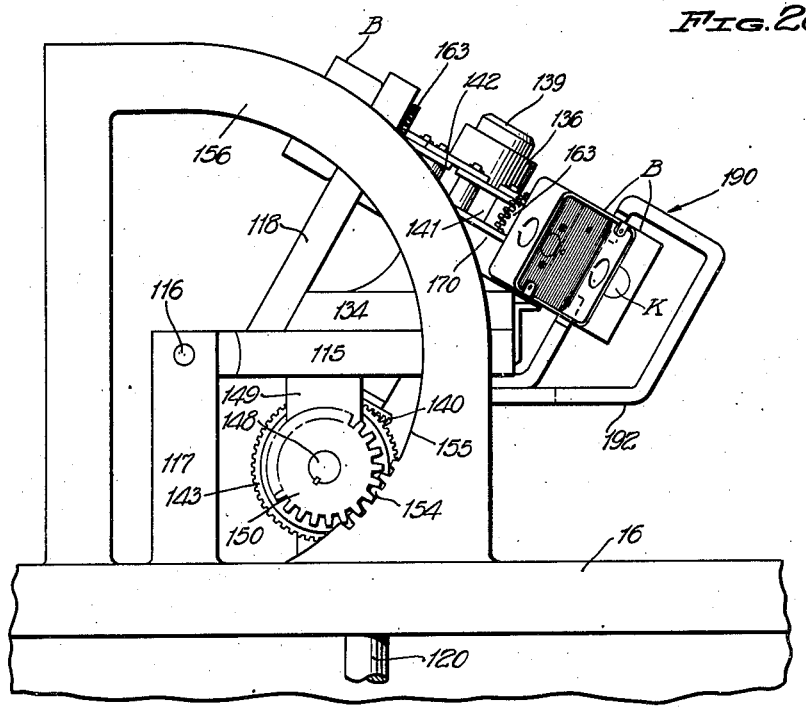
Figure 28 is a right end elevational view of the box carrier mechanism, the parts being shown in box pick up and box stripping position.
Figure 29:
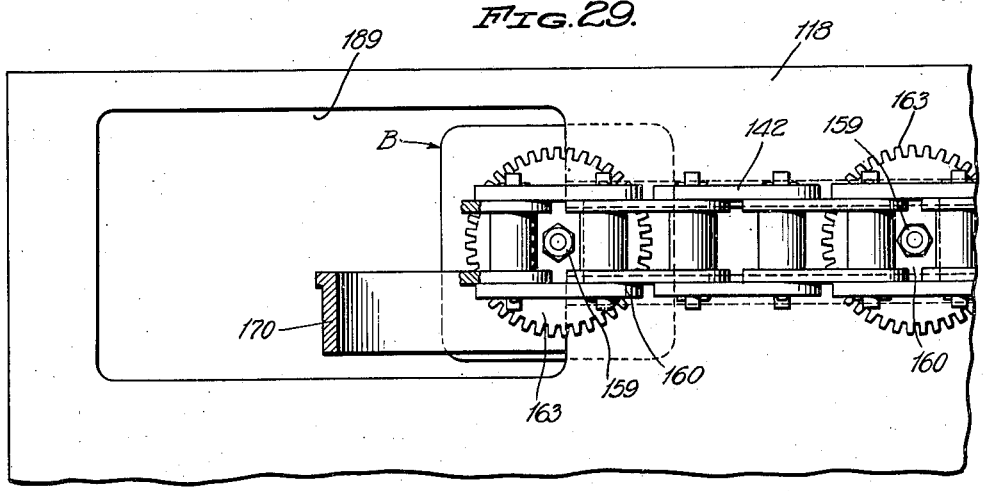
Figure 29 is an enlarged fragmentary vertical sectional view on the line 29—29 of Figure 24.

In Figures 1 and 2 of the drawings, there is illustrated a round thin blank of metal A which is placed in a drawing machine and drawn into the shape shown in Figures 3 and 4 to provide a box structure B consisting of a rectangular bottom wall C, four side walls D having irregular shaped edges E from portions of which the cover attaching ears are formed by cutting and bending operations performed by the automatic machine 10 to be hereinafter fully described. After the blank A has been drawn to the shape shown in Figs. 3 and 4, the metal box structure is placed into a punching machine to punch one or more knockouts F in the bottom wall C, and spaced opposed nail openings G, four of which are shown as being equidistantly spaced from the center of the bottom wall, although additional nail openings G may be provided. The operations so far described are performed by means other than by the automatic machine 10 and the box B is inserted into the machine 10 to perform the remaining operations necessary to complete the outlet box to finished form shown in Figure 16.

The metal box B is inserted into the automatic machine 10 in the form shown in Figures 5 and 6, use being made of a pair of opposed nail openings G to support the box in its travel through the machine. The first operation of the machine upon the metal box is to cut away the irregular edges E and to form upstanding ears H—H respectively on opposed side walls of the box and to punch holes J therein as illustrated in Figures 7 and 8. The next operation is to successively punch a knockout K in each of the four side walls of the box as shown in Figures 9 and 10, which operation disposes the knockouts K inward of the plane of the respective side walls. The machine successively replaces the knockouts K to the position shown in Figures 11 and 12, immediately after the knockout punching operations. The next operation is to bend the ears H—H inwardly as shown in Figures 13 and 14, followed by a screw thread tapping operation to thread the holes J (Figure 15). The next and final work operation of the machine is to subject the free edges of the box to a grinding operation to remove therefrom any burrs which might be present due to the previous trim cutting operations, whereupon the outlet box B assumes the finished appearance as illustrated in Figure 16.

The automatic box making machine 10 includes a U-shaped frame 11 of sturdy construction having a horizontal base 12, right and left upstanding end pedestals 13 and 14 respectively which have set back portions to provide opposed horizontal seats 15—15 which support the ends of a horizontal bed-plate 16, and which bed-plate is fixedly secured to the seats in any conventional manner. The tops of the pedestals 13 and 14 are provided with alined bearings 17—17 in which the ends of a cam shaft 18 are journaled. Fixed to the shaft 18 at suitably spaced intervals therealong are double cam members 19, three of which have been shown in Figure 17. Each cam member 19 comprises a ram lowering cam 20 and a ram lifting cam 21, the said cams 20 and 21 being connected by a hub 22. The cams 20 constantly engage rollers 23 rotatably mounted in bearings 24 extending upwardly from a ram 25, the ends of the ram being slidably mounted for vertical movement in gibs 26 provided on the inner sides of the pedestals 13 and 14. Pairs of transversely alined connecting rods 27 rise upwardly from the ram 25 and have their upper ends connected to a head plate 28. The pairs of connecting rods 27 are suitably spaced in a lengthwise direction and slide through a horizontal guide plate 28' which is supported at its ends upon the pedestals 13 and 14. The plate 28' is slotted as at 29 adjacent the cam members 19 to accommodate the same and the rollers 23. Rollers 21' are mounted in bearings 24' depending from the head plate 28 and respectively engage the cams 21. From the description thus far it will be understood that the ram 25 is in reality supported by the cam members 19, therefore any rotation imparted to the cam shaft 18 will impart a smooth uniform vertical reciprocating movement to the ram 25. The means for imparting reciprocating movement to the ram 25 will now be described although time intervals between each complete cycle of reciprocation occurs for reasons to be hereinafter appreciated and suitable control means for that purpose is provided.

The right end of the cam shaft 18 extends beyond the pedestal 14 and has a fly-wheel gear 30 freely rotatable thereon, the same having an inwardly extending recessed hub 31. The side wall of the recess of the hub 31 is provided with a bevel friction clutch surface 32 which constitutes a female clutch element which is engageable with a male beveled friction clutch element 33 slidably splined upon the shaft 18 as at 34. An expansion spring 35 is interposed between the male clutch element 33 and a collar 36 fixed to the shaft 17 and enclosed in the recessed hub. The spring 35 tends to normally slide the male clutch element away from the beveled surface 32 of the female clutch element, however, suitable electrically controlled means is provided to cause the male clutch element to drivingly engage the female clutch element in timed relation to the working parts of the machine. Such control means includes a flanged collar 37 fixed to the male clutch element 33 with which the yoke portion of a vertically disposed lever 38 is operatively connected, the yoke portion of the lever having bearing rollers 39 which engage the flanges of the flanged collar to prevent binding between the lever and the collar during relative movement therebetween. The upper end of the lever 38 is pivoted as at 40 to the platform 41 mounted on the top of the adjacent bearing 17, while the lower end of the lever is connected by a pin and slot connection 42 to the outer end of the sliding armature 43 of an electric solenoid 44, the latter being fixedly mounted on the pedestal 14. An electric motor 45 is mounted on the platform 41 and its armature shaft 46 has a pinion 47 which constantly meshes with the fly-wheel gear 30. Thus, by intermittently energizing the solenoid 44, the lever 38 is actuated to effect engagement and permit the disengagement of the clutch elements 33 and 32 to control intermittent rotation to the cam shaft 18 when the motor 45 is turned on to cause pinion 47 to continuously rotate the fly wheel gear 30.

Disposed beneath the ram 25 is a vertical horn-die carrier plate 48 which extends from the right end of the machine to a point short of the left end thereof and which has its ends slidably mounted in guide gibs 49 to facilitate up and down sliding movement in timed relation with the downward and upward movements respectively of the ram 25. When the plate 48 is at the limit of its downward movement its bottom side rests upon the front bevel face 50 of a sliding wedge plate 51 which is slidably supported by the top face of the bed plate 16. The sliding wedge plate 51 extends substantially the length of the carrier plate 48 and is guided during its sliding movement by a guide plate 52. By imparting a reciprocating sliding movement to the wedge plate 51 the same will alternately raise the carrier plate 48 and also permit the same to gradually drop by gravity to lowered position. The means for imparting reciprocating movement to the wedge plate 51 in suitably timed relation to the reciprocation of the ram 25 will now be explained.

Mounted rearward of the wedge plate 51 and extending lengthwise of the machine is a cam shaft 53 mounted in bearings 54. The right end of the shaft 53 extends beyond the right end pedestal 14 and has a Geneva wheel 55 fixed thereto, while the left end of said shaft terminates beyond the left end of the wedge plate 51. Two actuating egg shaped cams 56 are fixed to the shaft 53 and are respectively disposed beyond the ends of the wedge plate. Each cam 56 has a cam groove 57 in the inner face thereof which follows the peripheral contour thereof and into which a roller 58 rotatably mounted at the adjacent end of the wedge plate extends. There is a dwell spot in each cam 56 which permits the wedge plate 51 to remain stationary when the ram 25 is in down position and the horn carrier plate 48 is in a raised position as illustrated in Figure 21 for reasons to be hereinafter appreciated.

The cam shaft 53 is rotated by an intermittent drive consisting of the Geneva wheel 55 which is engaged by a Geneva pinion 59 which is fixed to a stub shaft 60 journaled in the pedestal 15 as best illustrated in Figs. 17 and 19. Fixed to the Geneva pinion is a pulley 61 about which a driving pulley belt 62 passes. The belt 62 also passes over a pulley 63 fixed to the power take-off shaft of a speed reducer 64 which is driven by an electric motor 65. The speed reducer and motor are supported by a bracket 66 attached to and extending outwardly from the right end of the U-shaped frame structure 11. By means of the Geneva movement, the continuous driving rotation of the speed reducer 64 is converted into an intermittent rotation for imparting a corresponding rotation to the cam shaft 53 to effect a step by step forward and backward movement to the wedge plate 51 through the medium of the cams 56 and rollers 58.

In view of the fact that to perform all of the trimming of the four side edges E of the box, to apply the knockouts K in the four side walls thereof, to replace the knockouts K, and to bend the two ears H, the ram 25 and horn carrier plate 48 must be provided with fourteen sets of complementary die elements, each set of die elements constituting a work station to which the outlet box B is presented during its travel from the right loading end of the machine to the left box discharge end thereof. In addition to the trimming, punching and bending dies for performing the above mentioned respective operations, there are two additional stations at the left end of the machine, namely, a tapping station Y for threading the holes J in the ears H, and a grinding station Z for removing burrs from the edges of the side walls of the box, thus making sixteen work stations in all, extending along the length of the machine, the first fourteen of which rely upon the timed vertical reciprocation of the ram 25 and horn carrier plate 48 for their respective operations. To simplify the description at this point, and by referring to Figure 17 of the drawings, we have designated the four trimming die stations $T^1$, $T^2$, $T^3$, and $T^4$ reading from left to right. Next to trimming station $T^4$ there follows four equidistantly spaced knockout stations $O^1$, $O^2$, $O^3$, and $O^4$. Following the series of successive knockout stations, are four successive return knockout stations $R^1$, $R^2$, $R^3$, and $R^4$. To the left of return knockout station $R^4$ are two successive ear bending stations $S^1$ and $S^2$. The specific complementary die elements performing the work attributed thereto will be set forth hereinafter, as will the tapping device located at the tapping station Y and the grinder located at the grinding station Z. All of the stations are equidistantly spaced from the right end trimming station $T^1$ to the ear bending station $S^2$, for the reason that the box carrier mechanism is intermittently operated and moves a box the same distance on each actuation thereof, which distance is equal to that between the stations $T^1$ to $S^2$.

Whereas the specific construction of the trimming, punching, and bending dies at the various work stations may be of various specific constructions, the lower die element carried by the carrier plate 48 of each die must be in the shape of a horn so as to enter the box when it is presented to the die station. Such shape of horn die element is illustrated in Figure 21 and constitutes the female horn die element 67 of one of the trimming dies located at trimming stations $T^1$, $T^2$, $T^3$, and $T^4$. The horn die element 67 is substantially inverted L shape in cross section, as are the lower die elements at the knock-out stations, return knockout stations, and ear bending stations. The horizontal portion of the die element 67 rests upon the top of the carrier plate 48 and extends beyond the plane of the front thereof, while the vertical portion fits against the rear face of said plate, there being fastening screws 68 for removably securing the die element 67 to the carrier plate. The underside of the ram 25 is provided with a longitudinally extending die attaching flange 69 to which all of the upper die elements at the various work stations are removably secured in vertical operative alinement with their complementary lower horn dies mounted along the length of the horn die carrier plate 48. The male complementary trimming die for the female or lower die 67 is designated 70, and like the other upper die elements, the same is secured to the flange 69 by screws 71. Each trimming die consisting of the complementary die elements 67 and 70 cuts the excess material from the irregular edge E from one side wall of the box E, thus as the four side walls of the box are successively presented to the trimming die stations T¹, T², T³ and T⁴ during each one-quarter revolution of the box, the edges of the box are trimmed to provide straight edges therearound. However, the trimming dies at trimming stations T¹ and T³ are so shaped as to cut the ears H—H from opposite walls of the box and such a die is illustrated at station T³ in Figure 33.

Each knockout die located at the successive knockout stations O¹, O², O³, and O⁴ is of a like construction and a detail of one of such knockout dies 72 is illustrated fragmentarily in Figure 34. The lower horn female die element 73 is provided with a round cavity 74 in its top face to receive the knockout K as the upper or male die element 75 carried by the ram 25 is brought down into punching relation therewith. The complementary knockout die elements 73 and 75 are formed to cut through the wall of the box but to leave a narrow connecting web L between the knockout and the wall from which it is punched to facilitate the breaking away of the knockout when the outlet box is in use. The punching of a knockout in the box causes the same to assume a position inwardly of the plane of the wall from which it is punched, thus after the knockouts have been successively punched in the four side walls, the box must be presented to the successive return knockout dies 76, at the return knockout work stations R¹, R², R³, and R⁴.

A detail view of one of the return knockout dies 76 is illustrated in Figure 35 wherein the lower female horn die element 77 is provided with a shallow recess 78 to receive the inner face of the knockout and cooperate with the upper male die element 79 to substantially return the punched knockout K to a plane within the side wall from which it is punched. The die elements 77 and 79 are respectively carried by the horn carrier plate 48 and flange 69 of the ram 25.

There are two ear bending dies respectively located at the ear bending stations S¹ and S², one of such ear bending dies being illustrated in detail in Figure 36 and designated 80 in its entirety. The lower horn female die element 81 is fixed to the horn carrier plate 48 and has a recess 82 in the top face thereof to receive the ear H when bent at right angle to the wall D with which it is integral by reason of the upper male bending die element 83. The die element 83 includes a depending finger 84' which coacts with the vertical wall 85' of the recess 82 to effect the necessary bending when the two bending die elements are brought together.

A thread tapping device 84 is provided at the ear tapping station Y for simultaneously threading the holes J in the ears H as the box is presented at the station Y. The tapping device 84 may be any conventional form of tapping machine that moves toward and away from the work, and in which the tap spindles of the machine may be alternately rotated in opposite directions. The tapping device 84 illustrated in Figure 37 includes a housing 85 which slidably supports a chuck block 86 which is movable toward and away from the box to be tapped, by a rock lever 87 having one end operatively connected to the block 86 and the other end connected by a pin and slot connection 88 to the sliding armature of a solenoid 89 attached to the platform 90 on which the tapping device 84 is supported. Two rotatable chucks 91—91 are mounted in the chuck block 86 and are driven by shafts 92, each of which shafts is constructed of telescopic sections to facilitate the back and forth sliding movement of the chuck block. The rear ends of the shafts 92 have pulleys 93 fixed thereto over which a belt 94 passes. The belt 94 also passes over a drive pulley 95 carried by the armature shaft of a reversible electric motor 96. The chucks 91 support thread taps 97 of a size to tap threads into the holes J of the ears H of the box during the forward movement of the chuck block 86. The operation of the motor 96 and solenoid 89 are controlled by a double acting electric switch 98 fixed to the rear of the horn carrier plate 48 as illustrated diagrammatically in Figure 38. The switch 98 includes a flexible spring switch contact 99 normally engaging a shorter motor reversing contact 100, the contacts 99 and 100 being arranged in the reverse driving circuit 101 with a source of electric energy. A second contact 102 is disposed inwardly of the contact 99 and normally spaced therefrom but engageable upon forward actuation of the switch contact element 99 to break the reversing circuit 101. The contacts 99 and 102 are arranged in a forward motor driving circuit 103 with the motor 96, solenoid 89, and with a source of electric energy. Thus the motor 96 is normally driven in a reverse direction to impart an unscrewing action to the threading taps 97, but as the wedge plate 51 nears its limit of forward sliding movement, a block of di-electric material 104 carried by the wedge plate pushes the contact switch element 99 out of engagement with the contact 100, and into engagement with the contact 102, thus breaking the reversing circuit 101 and closing the forward motor driving circuit 103. When the circuit 103 is closed, the solenoid 89 becomes energized and actuates the rock lever 89 to slide the chuck block forwardly and cause the taps 97 to thread the respective alined holes J of the ears H of the box. It is essential that the operation of the control of the motor 96 be suitably timed with respect to the lifting movement of the horn carrier plate 48 as will be appreciated hereinafter. When the wedge plate 51 moves rearwardly, the contact 99 moves away from the contact 102 under its own spring action and engages the contact 100, thus opening the circuit 103 and closing the reverse driving circuit 101. When the circuit 102 is broken, the solenoid 89 is de-energized whereupon a contractile spring 105 pulls the rock lever to a position to slide the chuck block 86 to retracted position as illustrated in Figure 37. Whereas we have illustrated a tapping device operated by a reversible motor, it will be understood that any conventional reversing chuck of standard make may be substituted, which type of chuck does not require the use of a reversing motor.

The final station along the length of the machine is the grinding station Z adjacent the left end thereof and at which a motor driven grinder 106 is arranged. The grinder 106 includes a grinding wheel 107 mounted on a horizontal axle 108 to which a gear 109 is fixed. The gear 109 has constant mesh with a pinion gear 110 mounted on the armature shaft of an electric motor 111 supported upon a platform 112 extending from a fixed upstanding wall 113.

Having described the various work stations extending along the length of the machine 10 and their respective functions, we shall now describe the novel box carrier mechanism designated in its entirety by the numeral 114, which successively presents a box B to the work stations T¹ to Z, however, after sixteen boxes or more have been fed to the box carrier mechanism, there will be boxes simultaneously presented to all sixteen work stations, the boxes being moved along one station at a time whereby a steady feed of boxes to the box carrier mechanism will result in a continuous flow of boxes through the machine from the loading end to the discharge end thereof. The box carrier mechanism 114 is disposed forward of the work stations and extends beyond the ends of the row of work stations. The carrier mechanism has an approximate thirty degree movement from a forwardly inclined box loading position as shown in Figure 26 to a vertical position (Figure 27), to present the boxes to the respective work stations relative to the horns of the trimming dies, knockout dies, return knockout dies, and ear bending dies. During approximately the first twenty degree movement of the carrier mechanism to upright position, the same moves the boxes the distance between adjacent stations, thus the travel of the box carriers is intermittent and in timed relation to the actuation of the ram 25 and horn carrier plate 48.

The box carrier mechanism 114 includes a base plate 115 extending substantially the length of the machine and which has its rear portion pivoted at 116 to an upstanding wall 117 which rises from the bed plate 16. Extending from the top face of the base plate 115 and along the length thereof at approximately sixty degree angle relative thereto is a box guide plate 118. Depending from the base plate 115 adjacent the ends thereof are pairs of spaced alined ears 119 to which the upper ends of actuating rods 120 are connected by pin and slot connections 121. The rods 120 freely slide in bearings 122 provided in the bed plate 16 and their lower ends are provided with forks 123 which carry rollers 124 on their inner sides which extend into the cam grooves 125 provided in opposite sides of the heart shaped cams 126 fixed to a cam shaft 127 journaled in bearings 128 depending from the bed-plate 16. The right end of the shaft 127 extends through and beyond the right side of the U-shaped frame 11 and has a Geneva wheel 129 fixed thereto which is intermittently rotated by a Geneva pinion 130 fixed to a stub shaft 131 journaled in the right end of the frame 11. Also fixed to the stub shaft 131 is a pulley 132 over which a belt 133 passes, the said belt also passing over the double groove pulley 63 driven by the motor 65 through the speed reducer 64. Power from the motor 65 is utilized for imparting intermittent actuation to the horn die carrier 48 and to the work carrier mechanism 114 in proper timed relation with respect to the various other mechanisms hereinbefore and about to be described.

Supported by and secured to the upper side of the base plate 115 and extending the length thereof is a plate 134 having an upstanding bearing 135 at the right end and a bearing 136 at the left end thereof. The axes of the bearings 135 and 136 are parallel to the guide wall 118 so as to assume a vertical position when the box carrier mechanism is in the position for presenting the boxes to the respective work stations. A stub shaft 137 is rigidly mounted in the bearing 135 on which a sprocket wheel 138 is rotatably mounted. A shaft 139 is journaled in the bearing 136 as best seen in Figure 31 and extends down through bearing openings in the plates 115 and 134, the lower extending end of said shaft carrying a bevel pinion gear 140. Also fixed to the shaft 139 on the same plane as the sprocket wheel 138 is a companion sprocket wheel 141, and passing about the sprocket wheels 138 and 141 is an endless conveyor sprocket chain 142. The sprocket chain 142 is intermittently actuated by imparting a predetermined rotation to the shaft 139 through the bevel pinion gear 140 which has constant mesh with a larger bevel gear 143 fixed to the right end of a stub shaft 144 journaled in a bearing 145 depending from the base plate 115 adjacent the left end thereof. The left end of the stub shaft 144 has a cup member 146 fixed thereto and which forms the driven element of a ratchet coupling 147. Axially alined with the left end of the shaft 144 is a short drive shaft 148 journaled in a bearing 149 depending from the base plate 115, the outer left end of the shaft 148 having a gear 150 fixed thereto. The inner right end of the shaft 148 has a ratchet wheel 151 fixed thereto which extends into the cup member 146. The ratchet wheel 151 has ratchet recesses 152 in the periphery thereof which wedge rollers 153 into engagement with the inner peripheral wall of the cup member upon driving movement of the gear 150 in a clockwise direction of rotation to rotatably connect the shafts 148 and 144, while the shaft 144 is disconnected from shaft 148 during counterclockwise rotation of the shaft 148 so as to remain stationary. Clockwise rotation is imparted to the gear 150 by a segmental series of gear teeth 154 provided on the curved edge 155 of a substantially D-shaped member 156 which is fixedly mounted at the left end of the bed-plate 16 as best illustrated in Figure 28. When the box carrier mechanism 114 is in forwardly inclined position the gear 150 is in mesh with the teeth 154 and said gear is turned by the teeth as the box carrier mechanism moves to its upstanding position but only for a period of approximately the first twenty degrees of swinging movement thereof, during which time the gear 150 is turned to drive the sprocket wheel 141 through shafts 148—144, ratchet coupling 147, gears 143—140, and shaft 139, a distance sufficient to move the sprocket chain 142 an amount equal to the distance between adjacent work stations T¹ to S¹ along the length of the machine, so that when the box carrier mechanism 114 is in its up position and the sprocket chain 142 is stationary between its intermittent movements, outlet boxes carried by the carrier units on the rear lead of the sprocket chain will present boxes to the respective work stations. Each box carrier unit 157 includes a stub shaft 158 having its inner end bolted or otherwise fixedly secured as at 159 to the connecting web 160 of one of the links of the chain 142 (Figure 30), and which web is set outwardly so as not to interfere with the free passage of the links of the chain about the sprockets 141 and 138. The axis of the stub shaft 158 is right angle to the axes of the sprocket shafts 139 and 137. Rotatably mounted on each stub shaft 158 is a hub 161 having a round bore for the hub and being provided with an exterior surface which is square in cross section as at 162 as best illustrated in Figure 25. Fixed to the inner end of the hub 161 is a gear 163 while fixed to the outer end thereof is an enlarged chuck head 164. The outer side of the chuck head 164 is flat and extending outwardly therefrom are diametrically disposed box grippers 165 which are equidistantly spaced from the axis of the head a distance equal to the spacing between a pair of diametrically opposed openings G—G in the bottom wall of an outlet box B. Each gripper 165 comprises a pair of confronting spring jaw members 166 having their inner ends fixedly secured to the chuck head 164 and their outer extending ends provided with reversely arranged V-shaped heads 167 which are normally spaced apart with their free ends so disposed as to enter the openings G when a box is fed to a carrier by a feeding mechanism presently to be described.

The flat sides of the hubs 161 of the box carrier units 157 ride upon an endless supporting rail 168 which is fixedly mounted on the base plate 115. The supporting rail 168 comprises a front rail section 169, curved end rail sections 170—170, and a rear rail section 171 as shown in Figure 24 of the drawings, the latter constituting the lower wall of an elongated guide slot 171' provided lengthwise in the plate 118. As the carrier units 157 ride along the rear rail section 171 they are simultaneously turned one-quarter revolution during their successive movements from work stations $T^1$ to $S^1$ to present the boxes to the four trimming, four knockouts, and four return knockout operations, while between ear bending stations $S^1$ and $S^2$ it is necessary to rotate the same one-half revolution, for the ears H—H are disposed on opposite side walls of the box. To effect the one-quarter revolution of the box carrier units at the proper interval, the gears 163 travel over spaced gear racks 172 provided on a mutilated rack bar 173 fixedly secured to the front side of the upstanding panel 119 (see Figure 25). The gear ratio between the rack 172 and gears 163 is such as to turn the carrier units one-quarter revolution during movement of the carrier units between stations $T^1$ and $S^1$. A longer gear rack 174 is provided between the ear bending stations $S^1$ and $S^2$ to impart a one-half rotation to the box carrier units as they pass from station $S^1$ to station $S^2$.

The guide slot 171' is provided with spaced enlarged portions 175 adjacent the gear racks 172 and 174 to permit the squared hubs 161 to clear the walls of the slot 171' during their rotating movements, the restricted intervening portions 175' between the walls of the slot 171' acting to guide the box carrier units and prevent accidental rotation thereof between stations.

A box loading mechanism 176 is provided at the front of the machine 10 adjacent the right end thereof and includes a stationary box magazine chute 177 into which the outlet boxes in the condition shown in Figures 5 and 6 are fed preparatory to their successive delivery to the box carrier units 157 by a box loaded member 178 located at the low discharge end of the chute. The box loaded member 178 comprises a body 179 having an angular tail piece 180 which is pivoted to ears 181 rising upwardly from the bedplate 16. The body is provided with an outlet box receiving seat 182 at its top onto which outlet boxes from the chute 177 are individually received. The tail piece 180 is provided with a forwardly extending lug 183 which engages an adjustable stop 184 provided on the bed plate 16 when the loader member 178 is in box receiving position, as shown in Fig. 27, the forward overbalancing of the loader member tending to normally cause the same to assume a position with the seat 182 adjacent the discharge end of the chute. The upper end of the body 179 is provided with a forwardly extending closure element 185 which moves to a position across the discharge end of the chute when the loader member 178 is moved to loading position relative to a box carrier unit as illustrated in Figure 26 to prevent the next box to be loaded from sliding from the chute. The loader member 179 is actuated to loading position as the base plate 115 of the carrier mechanism 114 swings downwardly by means of an adjustable striker 186 carried by the underside of the plate 115 forcibly striking a lip 187 extending rearwardly from the body 179. The intermittent actuation of the chain 142 successively presents the box carrier units 157 to the box loading mechanism 176, and as the box carrier mechanism is likewise intermittently actuated to swing down and up, it actuates the loader member 179 on its down movement to cause the loader member to swing toward the carrier mechanism and deliver a box to an empty box carrier unit 157, at which time the box grippers 165 enter a pair of diametrically opposed openings G in the bottom wall of the box, after which the carrier mechanism moves upwardly, the sprocket chain 142 is driven a predetermined distance to shift the loaded carrier units successively to the work stations, the loader member 178 swings down under its own weight uncovering the discharge end of the chute 177, and permitting the lowermost box in the chute to slide onto the seat 182 for subsequent delivery to the next empty box carrier unit 157 as it moves up to the loading mechanism 176.

As the box carrier units 157 and boxes carried thereby move about the sprocket 139, they pass through an enlarged opening 188 in the plate 118 disposed at the right end of the slot 171', after which the hubs 161 of the carriers enter slot 171' and are successively moved to the respective work stations from $T^1$ to Z. After leaving the grinding station Z, the box carrier units and the boxes carried thereby pass through an enlarged opening 189 disposed at the left end of the slot 171' and thence pass about the sprocket 141 onto the front lead of the chain. At this time, the outlet boxes have been subjected to the line of work stations extending from $T^1$ to Z and are now ready to be removed from the box carrier units 157. For this purpose we provide a box stripper device 190 at the left front end of the machine which forces the boxes from the resilient grippers 165 of the box carrier units as the finished boxes are respectively presented thereto. The box stripper device 190 is fixedly secured to the base plate 115 of the carrier mechanism 114 and includes an upstanding wall 191 integral with a supporting frame-like structure or bracket 192. The wall 191 is provided with a slot 193 extending the length thereof of a width to accommodate the chuck heads 164 of the box carrier units. The inner side of the wall 191 at opposite sides of the slot is provided with wedge camming surfaces 194 which extend to the entrance to the slot 193. As the boxes enter the slot 193, the bottom wall C of the box engages the surfaces 194 and the box is gradually wedged free from the resilient jaws 166, whereupon the empty box carrier unit moves toward the right along the rail section 169 in the direction of the box loading mechanism 176 and the finished outlet box drops from the machine. A receptacle or chute may be located beneath the box stripper device 190 to catch the outlet boxes as they are successively stripped from the box carriers.

In Figure 39 of the drawings there is illustrated a wiring diagrammatic view of the means for intermittently energizing the solenoid 44 for effecting engagement and disengagement of the clutch elements 32 and 33 whereby to intermittently actuate the ram 25 relative to the intermittent up and down movements of the horn die carrier 48. The solenoid 44 is arranged in an electrical circuit 195 having a source of electrical energy. Also arranged in the circuit 195 is a normally open switch 196 consisting of a fixed contact 197 and a movable switch element 198, the latter being disposed in the path of upward movement of a switch actuating arm 199 fixed to and extending rearwardly from the horn die carrier 48. As the horn die carrier nears the limit of its upward movement by reason of the actuation of the sliding wedge plate 51, the arm 199 pushes the switch element 198 into engagement with the contact 197 which closes the circuit 195, thus energizing the solenoid 44 which effects a driving connection between the drive clutch element 32 and the driven clutch element 33 whereby to impart rotation of the cam shaft 18 which is necessary to effect a down and up movement to the ram 25 which carries the upper die elements located at the respective work stations from $T^1$ to $S^2$.

While we have specifically described the various mechanisms embodied in the automatic outlet box making machine and the operation thereof, a brief explanation of the relative timing of the various mechanisms of the machine will now be set forth. It will be understood, however, that the intermittent reciprocation of the ram 25 and horn die carrier 48, are timed to operate relative to each other to perform the trimming of the box edges, the punching of the knockouts, the punching to replace the knockouts, and the ear bending operations. The various horn dies must move into the box before these operations take place. The work operations upon the boxes takes place after the box carrier mechanism 114 has been moved up to present the boxes to the work stations by actuation of its operating mechanism which is in timed relation to the intermittent operations of the ram and horn die carrier. As the box carrier mechanism 114 moves up, the sprocket drive operates to move the carrier chain 142 a distance to move the boxes to their next respective work stations. When the machine is operating at maximum capacity, there will be outlet boxes presented simultaneously to all the work stations from $T^1$ to Z whereupon each complete intermittent cycle of operation of the machine, an outlet box is fed to a box carrier unit 157 of the mechanism 114 by the loading mechanism 176, and a completed outlet box is discharged from the machine as the box passes the stripper device 190.

Tracing the course of a single outlet box through the machine 10, it follows that the box loading mechanism 176 presents a box to a box carrier unit 157 when the box carrier mechanism 114 is down in the position shown in Figure 26. As the box carrier mechanism swings up, the sprocket drive is operated by the meshing of gear 150 with the stationary gear segment 154 to move the sprocket chain 142 a distance between work stations. When the box reaches the first work station $T^1$ one of its side walls is subjected to the trimming die 67 located at that station. As the sprocket chain turns on its next intermittent operation, the gear 163 of the box carrier unit engages a rack 172 and the box carrier and box are turned one-quarter revolution to present the next adjacent side wall to the next trimming die located at station $T^2$ and similarly upon successive operations of the sprocket chain to the remaining trimming stations and throughout the successive stations $T^3$ to $R^4$ for the trimming of the four side walls, for punching knockouts in the four side walls, and for returning the knockouts in the four side walls. As the box reaches station $S^1$, its carrier unit 157 is turned one-half revolution during its passage to station $S^2$ by the gear 163 engaging the rack 174 to facilitate the successive presentation of the diametrically opposed ears H to the bending dies 80 at the stations $S^1$ and $S^2$. The box next moves to the tapping station Y where the ears are simultaneously tapped by the taps 97 of the thread tapping machine 84. The box next moves to the grinder 106 at station Z where the edges of the side walls of the box are brought into contact with the outer face of the grinding wheel 107 to remove rough burrs from the trimmed edges of the box, and thus complete the making of an outlet box as shown in Figure 16. As previously explained, the finished box finally reaches the stripper device 190 which disconnects the box from its carrier unit.

While we have shown and described what we consider to be the preferred embodiment of the invention for a combined automatic machine and specifically set forth the use of the same for the making of electric outlet boxes, it is to be understood that such changes in construction, design, proportions, and uses, may be resorted to if desired, and we do not wish to restrict ourselves to anything less than the whole of the invention as set forth in the claims hereto appended.

Having thus described the invention, what we claim as new and desire to secure by Letters Patent of the United States, is:

1. In a combined automatic machine for use in the making of metal outlet boxes, a plurality of metal box carrier units, each including a rotatable chuck for supporting a metal box to be worked upon, a row of work stations, means for intermittently moving said carrier units successively into alined positions relative to the respective work stations, work performing means located at the respective work stations for successively trimming the edges of the side walls of metal boxes, punching knockouts successively in the respective side walls of the boxes, and for successively returning the punched knockouts, and means for imparting simultaneous partial rotation to the chucks during each intermittent movement of the carrier units to successively present the side walls of the boxes to the respective work performing means.

2. In a combined automatic machine for use in the making of metal outlet boxes, a plurality of metal box carrier units, each including a rotatable chuck for supporting a metal box to be worked upon, a row of suitably spaced work stations, means for intermittently moving said carrier units successively into alined positions relative to the respective work stations, work performing means located at the respective work stations for successively trimming the edges of the side walls of metal boxes of surplus material and forming perforated cover attaching ears on opposed side walls thereof, punching knockouts successively in the respective side walls of the boxes, and for successively returning the punched knockouts, for bending the attaching ears at right angle to the respective side walls on which they are formed, and for thread tapping the perforated cover attaching ears, and means for imparting simultaneous partial rotation to the chucks during each intermittent movement of the carrier units to successively present the side walls of the boxes to the respective work performing means.

3. In a machine for use in the making of metal outlet boxes, a row of equidistantly spaced work stations to which a pre-shaped drawn metal box is presented for successively trimming the free edges of the side walls of the same, successively punching knockouts in the respective side walls of the box, and successively replacing the knockouts, tool means located at the respective work stations for performing the respective work functions assigned thereto, box carrier means for simultaneously presenting boxes to the respective work stations for operation thereon by the tool means, said box carrier means including a plurality of carrier units, each carrier unit including a rotary chuck for supporting a box, means for intermittently moving the box carrier means a distance to cause the carrier units to move from one work station to the next adjacent work station, and means for turning the rotary chucks a predetermined degree of rotation during the movement of the box carrier units between work stations for successively presenting the side walls of the metal boxes to the respective tool means.

4. In a machine for making metal outlet boxes, means for successively trimming the free edges of the side walls of the box and for shaping the cover attaching ears thereof, means for successively punching knockouts in the respective side walls of the box, means for successively pressing the knockouts to return them within the side walls, means for bending the ears formed by the trimming means, and box carrier means for successively presenting side walls of the metal boxes to the aforementioned means in the order named.

5. In a machine for making metal outlet boxes, means for successively trimming the free edges of the side walls of the box and for shaping the cover attaching ears thereof, means for successively punching knockouts in the respective side walls of the box, means for successively pressing the knockouts to return them within the side walls, means for bending the ears formed by the trimming means at right angle to the side walls, ear thread tapping means, edge grinding means, and box carrier means for successively presenting the side walls of the metal boxes to the aforementioned means in the order named.

6. In a combined automatic machine for use in the making of metal outlet boxes, a plurality of metal box carrier units, each including a rotatable chuck for supporting a metal box to be worked upon, a row of work stations, means for intermittently moving said carrier units successively into alined positions relative to the respective work stations, box feeding means located in advance of the first work station of said row of work stations for feeding boxes to the carrier units during intervals of rest between intermittent movements of the carrier units, work performing means located at the respective work stations for successively trimming the edges of the side walls of metal boxes, punching knockouts successively in the respective side walls of the boxes, and for successively returning the punched knockouts, and means for imparting simultaneous partial rotation to the chucks during each intermittent movement of the carrier units to successively present the side walls of the boxes to the respective work performing means.

7. In a combined automatic machine for the making of outlet boxes as set forth in claim 6, including automatic means located beyond the last work station of the row of work stations for releasing the boxes from the carrier units.

8. In a machine for use in the making of metal outlet boxes, a row of equidistantly spaced work stations to which a pre-shaped drawn metal box is presented for successively trimming the free edges of the side walls of the same, successively punching knockouts in the respective side walls of the box, and successively replacing the knockouts, tool means located at the respective work stations for performing the respective work functions assigned thereto, box carrier means for simultaneously presenting boxes to the respective work stations for operation thereon by the tool means, said box carrier means including a plurality of carrier units, each carrier unit including a rotary chuck for supporting a box, means for intermittently moving the box carrier means a distance to cause the carrier units to move from one work station to the next adjacent work station, automatic box feeding means located in advance of the first work station of said row of work stations for feeding boxes to the rotary chucks of the carrier units, and means for turning the rotary chucks a predetermined degree of rotation during the movement of the box carrier units between work stations for successively presenting the side walls of the metal boxes to the respective tool means.

9. In a machine for use in the making of metal outlet boxes as set forth in claim 8 including automatic means located beyond the last work station of the row of work stations for separating the boxes from the rotary chucks.

MABEL B. WALKER,
TRUST COMPANY OF GEORGIA,
By CARROLL PAYNE JONES,
*Trust Officer,*
*Executors of the Estate of Ralph M. Walker, Deceased.*
GEORGE P. ALEXANDER.